United States Patent [19]

Shaw et al.

[11] 4,432,049
[45] Feb. 14, 1984

[54] PROGRAMMABLE MODE SELECT BY RESET

[76] Inventors: Pern Shaw, 9003 Viking Dr., Austin, Tex. 78758; Donald L. Tietjen, 1200 Barton Hills Dr., Apt. 185, Austin, Tex. 78704; Michael F. Wiles, 1902 Flintrock St., Round Rock, Tex. 78664

[21] Appl. No.: 192,157

[22] Filed: Sep. 29, 1980

Related U.S. Application Data

[63] Continuation of Ser. No. 939,721, Sep. 5, 1978, abandoned.

[51] Int. Cl.³ .................... G06F 3/00; H03K 17/00
[52] U.S. Cl. .................................................. 364/200
[58] Field of Search ... 364/200 MS File, 900 MS File, 364/700, 715, 709; 365/189, 191, 233

[56] References Cited

U.S. PATENT DOCUMENTS

| | | | |
|---|---|---|---|
| 3,470,538 | 9/1969 | Harbaugh | 364/200 |
| 3,535,560 | 10/1977 | Cliff | 364/200 X |
| 3,786,433 | 1/1974 | Notley et al. | 364/200 |
| 3,931,507 | 1/1976 | Brantingham | 364/715 X |
| 4,030,073 | 6/1977 | Armstrong, Jr. | 364/200 |
| 4,051,326 | 9/1977 | Badagnani et al. | 364/900 X |
| 4,089,062 | 5/1978 | McElroy et al. | 364/900 X |
| 4,097,923 | 6/1978 | Eckert, Jr. et al. | 364/200 |
| 4,148,099 | 4/1979 | Lauffer et al. | 365/191 X |

*Primary Examiner*—Eddie P. Chan

[57] ABSTRACT

A mode selection circuit is disclosed which is suitable for configuring a data processor at the time at which the data processor is initialized with a reset signal. Mode selection latches are coupled to terminals normally used as an input/output port for the data processor and the latches are clocked with a signal generated by a level detector circuit which senses the reset signal. The mode selection latches are programmed by applying appropriate logic levels to the terminals of the input/output port at the time at which the data processor is being reset. The circuitry is adapted for allowing the connection of a diode from a terminal of the input/output port to the reset terminal of the data processor in order to program a low logic level into the corresponding mode detection latch.

9 Claims, 4 Drawing Figures

PROGRAMMABLE MODE SELECT BY RESET

CROSS REFERENCE TO RELATED APPLICATIONS

This is a continuation of application Ser. No. 939,721, filed Sept. 5, 1978, now abandoned.

1. "Microcomputer" invented by Wiles et al, bearing Ser. No. 873,045, now abandoned filed on Jan. 27, 1978 and assigned to the assignee of the present invention.

2. "Microprocessor" invented by Ritter et al, bearing Ser. No. 872,857, now abandoned filed on Jan. 27, 1978 and assigned to the assignee of the present invention.

3. "Microprocessor Having Plural Internal Data Buses" invented by Daniels et al, issued May 5, 1981 as U.S. Pat. No. 4,266,270 and assigned to the assignee of the present invention.

4. "Carry Anticipator Circuit And Method" invented by Wiles et al, issued May 13, 1980 as U.S. Pat. No. 4,203,157 and assigned to the assignee of the present invention.

TECHNICAL FIELD

This invention relates generally to a data processor and more particularly to circuitry for selecting the mode of operation for a data processor.

BACKGROUND ART

Applications for integrated circuit data processors are rapidly increasing. Various applications for these data processor devices may require varying configurations of the input-output circuitry associated with a data processor device. In order for a single data processor device to be employed within these varying applications, the input-output circuitry of a data processor must be flexible such that it can be programmed to satisfy the needs of any particular application. In co-pending application Ser. No. 873,045, now abandoned "Microcomputer" by Wiles et al, assigned to the assignee of the present invention and incorporated herein by reference, a microcomputer is disclosed which has a plurality of operating modes which allow the microcomputer device to be used in a wide variety of configurations.

One prior art approach for providing various configurations of the input-output circuitry for a data processor is to provide a plurality of mask options which vary the integrated circuit metal interconnections during processing such that a particular metal mask is used to provide an integrated circuit data processor of the desired configuration. However, this approach results in higher costs for processing, testing, and inventory control since each mask option results in a unique integrated circuit. Another prior art approach is to make the configuration of the processor device software programmable such that instructions are stored in a program memory which must be executed by the processor to achieve the desired configuration of the input-output circuitry for the data processor device. However, this approach increases the number of storage locations required for the program memory. A third prior art approach is to hardware-program the mode of operation by providing separate program selection inputs to the data processor for configuring the input-output circuit. This approach is also costly in that additional package pins are required for the integrated circuit device in order to determine the mode of operation.

BRIEF SUMMARY OF THE INVENTION

It is an object of the present invention to provide circuitry for selecting the mode of operation for a data processor while avoiding the need for mask options, additional software, or extra integrated circuit package pins.

It is a further object of the present invention to provide circuitry which selects the mode of operation for a data processor whenever the data processor is powered-up or restarted.

These and other objects are accomplished by providing a circuit adapted for implementation within an integrated circuit data processor, the circuit including a reset terminal for receiving a reset signal, circuitry responsive to the reset signal for causing initialization of the data processor, one or more input-output terminals which are generally used to transmit digital information to and from the data processor but receive one or more mode selection signals when the data processor is being reset, a level detector responsive to the reset signal which generates an output signal when the reset voltage reaches a predetermined level, and storage circuitry adapted for storing the one or more mode selection signals when the level detector generates the output signal. In the preferred embodiment, level shifting circuitry is included which shifts the voltage level of the mode selection signal such that the mode selection signal may be generated by either connecting a diode between the input-output terminal and the reset terminal for causing a mode selection signal to assume a first logic state or omitting the diode and causing the mode selection signal to assume the second logic state.

BRIEF DESCRIPTION OF THE DRAWINGS

FIG. 3 illustrates timing waveforms for various signals generated by the circuitry shown in FIGS. 1 and 2.

FIG. 4 is a block diagram illustrating an application of the mode selection circuitry for selecting the configuration of a data processor.

DETAILED DESCRIPTION OF THE INVENTION

Figure 1:
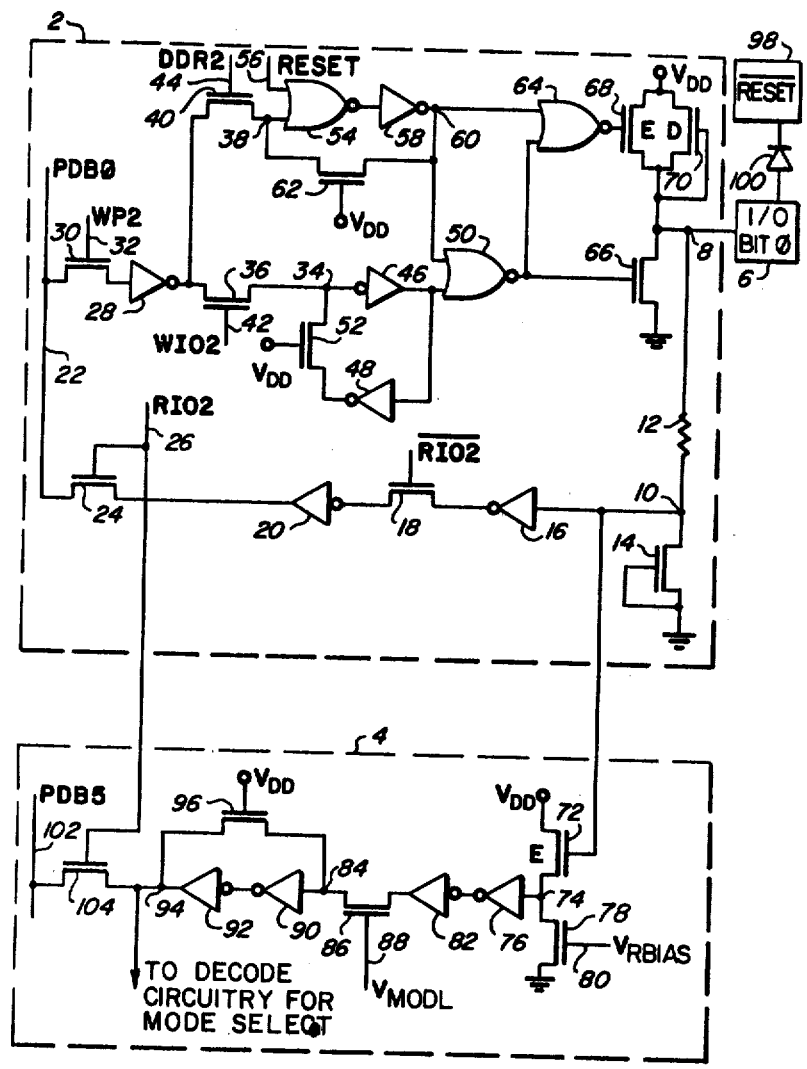
FIG. 1 is a circuit schematic including a block of circuitry conventionally associated with an input-output pin of a data processor together with a block of circuitry for storing a mode selection signal.

FIG. 1 is a circuit schematic of circuitry associated with an input-output terminal of a data processor including conventional input-output circuitry within dashed block 2 and mode selection circuitry within dashed block 4. Input/output terminal 6 is coupled to node 8, and node 8 is coupled to node 10 by resistor 12. MOSFET device 14 has its drain coupled to node 10 while the gate and source are coupled to ground potential. Since the operation of MOSFETs (metal-oxide-semiconductor field-effect transistors) is well-known by those skilled in the art, it will not be described in further detail herein. For an explanation of the operation of MOSFETs, see "Physics and Technology of Semiconductor Devices" A. S. Grove, John Wiley and Sons, Inc., 1967. MOSFET device 14 serves as an input protection device so as to prevent the potential at node 10 from becoming so negative as to cause damage to other devices within the circuit. Node 10 is coupled to the input of inverter 16 which has an output coupled to one terminal of MOSFET device 18. The gate terminal of MOSFET 18 is coupled to control signal $\overline{RIO2}$ such that MOSFET 18 is conductive when control signal $\overline{RIO2}$ is at a high level. A third terminal of MOSFET 18 is coupled to the input of inverter 20. The output of inverter 20 is coupled to PDB0 conductor 22 by MOSFET 24. The gate terminal of MOSFET 24 is coupled to conductor 26 which conducts a control signal RIO2 such that MOSFET 24 is conductive when RIO2 is at a high level.

Conductor 22 corresponds to the least significant bit of a data bus within the data processor in the preferred embodiment of the invention. PDB0 conductor 22 may be used to transfer digital information between input-/output circuitry block 2 and working registers (not shown) within the data processor. In order to transfer digital information from input/output pin 6 to PDB0 conductor 22, control signal $\overline{RIO2}$ is initially at a high level while control signal RIO2 is initially at a low level. The signal received by input/output pin 6 is coupled to the input of inverter 16 by resistor 12, and the inverted output signal is coupled to the input of inverter 20 by MOSFET 18. Subsequently, control signal $\overline{RIO2}$ switches to a low level while control signal RIO2 switches to a high level such that MOSFET 18 turns off while MOSFET 24 becomes conductive. The inverted signal initially coupled to the input of inverter 20 by MOSFET 18 is dynamically stored on the input of inverter 20 after MOSFET 18 is turned off. The output of inverter 20 is then coupled by MOSFET 24 to PDB0 conductor 22 in order to complete the transfer of the digital information to the internal data bus.

PDB0 conductor 22 is also coupled to the input of inverter 28 by MOSFET 30. The gate terminal of MOSFET 30 is coupled to conductor 32 which conducts control signals WP2 such that MOSFET 30 is conductive when WP2 is at a high level. The output of inverter 28 is coupled to node 34 by MOSFET 36 and is also coupled to node 38 by MOSFET 40. The gate terminal of MOSFET 36 is coupled to conductor 42 which conducts control signal WIO2 such that MOSFET 36 is conductive when WIO2 is at a high level. The gate terminal of MOSFET 40 is coupled to conductor 44 which conducts control signal DDR2 such that MOSFET 40 is conductive when DDR2 is at a high level. Node 34 is coupled to the input of inverter 46 which has an output coupled to the input of inverter 48 and to a first input of NOR gate 50. The output of inverter 48 is coupled to node 34 by MOSFET 52 which has its gate terminal coupled to positive supply voltage VDD. Inverter 46, inverter 48, and MOSFET 52 form a feedback latching circuit.

Node 38 is coupled to a first input of NOR gate 54 while the second input of gate 54 is coupled to conductor 56 which conducts control signal RESET. The output of gate 54 is coupled to the input of inverter 58 which has an output coupled to node 60. Node 60 is coupled to node 38 by MOSFET 62 which has a gate terminal coupled to the positive supply voltage VDD. NOR gate 54, inverter 58, and MOSFET 62 form a feedback latching circuit which may be a portion of a data direction register as will be explained later. Node 50 is coupled to the second input of gate 50 and is also coupled to a first input of NOR gate 64. The output of gate 50 is coupled to the second input of gate 64 and to the gate terminal of MOSFET 66. The source of MOSFET 66 is coupled to ground potential while the drain of MOSFET 66 is coupled to node 8. The output of gate 64 is coupled to the gate terminal of enhancement mode MOSFET 68 which has its drain terminal coupled to the positive supply voltage VDD and its source coupled to node 8. A depletion mode MOSFET 70 has a drain terminal coupled to the positive supply voltage VDD while its gate and source terminals are coupled to node 8.

When input/output pin 6 is to function in the input mode, then MOSFET 66 and MOSFET 68 are turned off such that node 8 is allowed to appear as a high impedance. When node 60 is at a high level or logic "1", then gate 64 and gate 50 both output a low level such that MOSFET devices 66 and 68 are cut off. When the data processor is first powered-up or when the $\overline{RESET}$ input pin 98 is strobed, the RESET control signal coupled to conductor 56 assumes a logic "1" level which causes the data direction register latch formed by gate 54, inverter 58 and MOSFET 62 to store a logic "1" on node 60. Thereafter, in order to allow input/output pin 6 to function as an output, the data direction register must be caused to store a logic "0" on node 60. This may be accomplished by providing a logic "1" level on conductor 22 and enabling MOSFET 30 and MOSFET 40 by causing control signal WP2 and control signal DDR2 to be at a high level. Once the data direction register is programmed for the output mode, the logic state of input/output pin 6 is determined by the logic state stored by the latch formed by inverters 46, 48 and MOSFET 52. The logic state on PDB0 conductor 22 will be copied into the latch by enabling MOSFETs 30 and 36 by forcing control signal WP2 and WIO2 to a high level. The decoder circuitry for generating the various control signals is conventional and will not be described herein.

Node 10 is also coupled to the gate terminal of enhancement mode MOSFET 72 within dashed block 4. The drain of MOSFET 72 is coupled to the positive supply voltage VDD and the source is coupled to node 74. Node 74 is coupled to the input of inverter 76 and is also coupled to the drain of MOSFET 78. The source of MOSFET 78 is coupled to ground potential while the gate terminal is coupled to conductor 80 which conducts a bias voltage which will be later discussed with reference to FIG. 2. MOSFET 72 acts as a level shifter or source-follower while MOSFET 78 acts as a current source.

The output of inverter 76 is coupled to the input of inverter 82. The output of inverter 82 is coupled to node 84 by MOSFET 86. The gate terminal of MOSFET 86 is coupled to conductor 88 which conducts a control signal VMODL which will be later discussed with reference to FIG. 2. Node 84 is coupled to the input of inverter 90, and the output of inverter 90 is coupled to the input of inverter 92. The output of inverter 92 is coupled to node 94, and node 94 is coupled to node 84 by feedback MOSFET 96. The gate terminal of MOSFET 96 is coupled to the positive supply voltage VDD such that inverter 90, inverter 92, and MOSFET 96 form a feedback latching circuit. The logic state stored by the latching circuit can be initialized by causing control signal VMODL to be a high level such that MOSFET 86 is made conductive. At such time, the voltage at input/output pin 6 will determine the logic state stored by the latching circuit.

As will be later explained, the mode programming latch register formed by inverter 90, inverter 92 and MOSFET 96 is initialized when the data processor is reset. Shown in FIG. 1 is RESET input pin 98 and a diode 100 having its anode coupled to input/output pin 6 and its cathode coupled to RESET pin 98. Diode 100 would be included if it is desired to store a logic "0" in the mode programming latch register. In this event, when RESET pin 98 goes to a low level in order to reset the data processor, then diode 100 pulls pin 6 to within 0.7 volt of a low logic level. Level shifting MOSFET 72 translates the voltage on pin 6 by one MOSFET threshold drop to a more negative voltage such that the input of inverter 76 recognizes the voltage on pin 6 as a low level. If it is desired for the mode programming latch register to latch a logic "1" level, then diode 100 is omitted and depletion mode pullup MOSFET 70 establishes a high level on pin 6.

In the preferred embodiment, the output of mode programming latch register node 94 is coupled to decoder circuitry for controlling the configuration of the data processor circuit. Also, the output of mode programming latch register node 94 is coupled to PDB5 conductor 102 by MOSFET 104 such that the status of the mode programming latch register can be accessed by the internal data bus of the data processor. The gate terminal of MOSFET 104 is coupled to conductor 26 such that MOSFET 104 is conductive when control signal RIO2 is at a high level.

Figure 2:
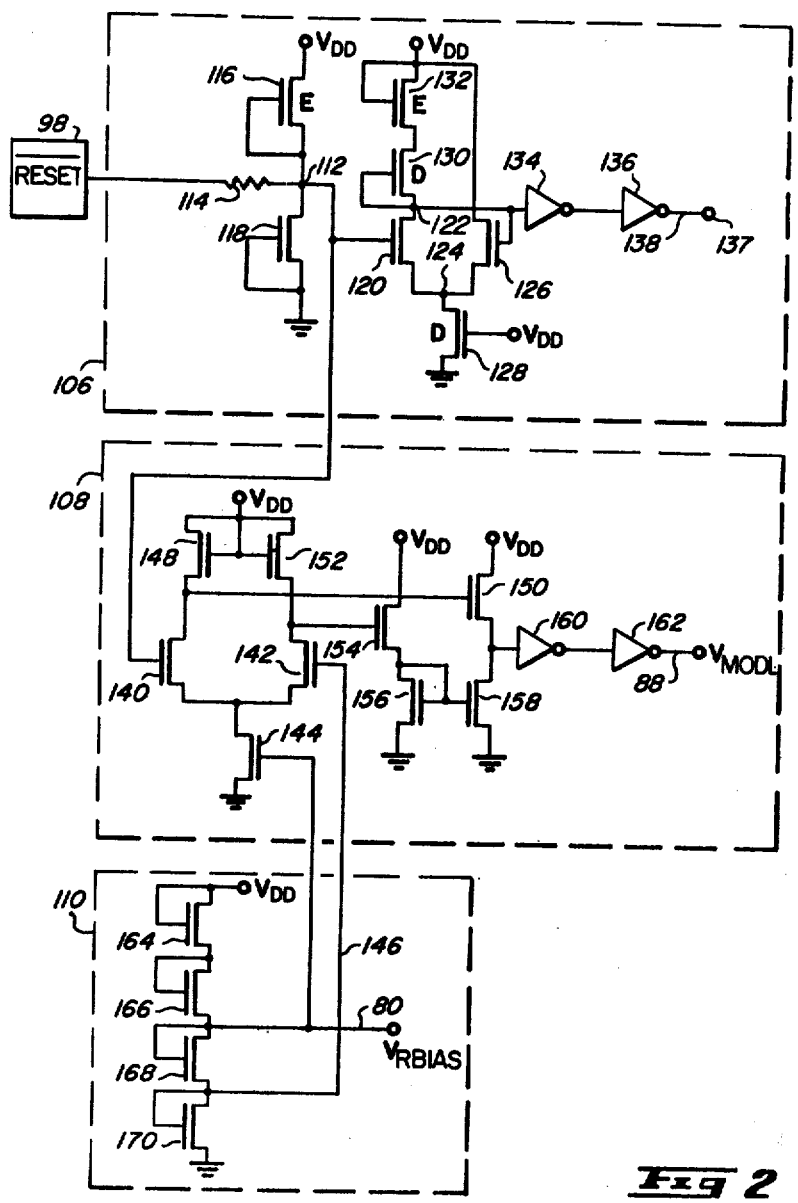
FIG. 2 is a circuit schematic of circuitry associated with the reset terminal including a block of circuitry for generating a control signal to initialize the data processor, a block of circuitry used to implement the mode selection feature, and a bias chain block.

In FIG. 2, circuitry for generating a reset signal to initialize the data processor is shown within block 106. Within block 108, circuitry is shown for generating the control signal VMODL already referred to within FIG. 1. Also within dashed block 110, bias circuitry is shown for generating various bias points. RESET input pin 98 is coupled to node 112 by input resistor 114. Node 112 is coupled to the gate and source terminals of enhancement mode MOSFET 116 which has its drain terminal coupled to the positive supply voltage VDD. Node 112 is also coupled to the drain terminal of enhancement mode MOSFET 118 which has its gate and source terminals coupled to ground potential. MOSFETs 116 and 118 are input protection devices and serve to limit the magnitude of the voltage on node 112 so as to protect other MOSFET devices coupled to this node.

Node 112 is coupled to the gate terminal of MOSFET 120 which has its drain terminal coupled to node 122 and its source terminal coupled to node 124. Node 124 is coupled to the source terminal of depletion mode MOSFET 126 and to the drain terminal of MOSFET 128. MOSFET 128 has its gate terminal coupled to the positive supply voltage VDD and its source terminal coupled to ground potential such that MOSFET 128 functions as a current source. MOSFET 126 has its drain coupled to the positive supply voltage VDD and its gate terminal coupled to node 122. Node 122 is also coupled to the source and gate terminals of depletion mode MOSFET 130 which has its drain terminal coupled to the source terminal of enhancement mode MOSFET 132. The gate and drain terminals of MOSFET 132 are coupled to the positive supply voltage VDD. MOSFETs 120 and 126 form a differential amplifier connected as a Schmidt trigger circuit. The voltage on the gate terminal of MOSFET 126 varies as the drain current from MOSFET 128 is switched between MOSFET 120 and MOSFET 126 so as to provide hysteresis. Node 122 is also coupled to the input of inverter 134, which has an output coupled to the input of inverter 136. The output of inverter 136 is coupled to terminal 137 by conductor 138. Terminal 137 may be coupled to synchronization circuitry (not shown) such that the asynchronous reset signal provided by terminal 137 may be sychronized with clock signals generated within the data processor to provide a synchronized RESET signal. The synchronized RESET signal may then be used to clear the registers within the data processor and to initiate execution of instructions stored in the program memory. As shown in FIG. 1, the synchronized RESET signal may also be used to initialize the data direction register which controls input/output circuitry.

Node 112 is also coupled to the gate terminal of MOSFET 140 within dashed block 108. The source terminal of MOSFET 140 is coupled to the source terminal of MOSFET 142 and to the drain terminal of MOSFET 144. The gate terminal of MOSFET 144 is coupled to conductor 80 which provides a first bias voltage VRBIAS. The source of MOSFET 144 is coupled to ground potential such that MOSFET 144 functions as a current source. The gate terminal of MOSFET 142 is coupled to conductor 146 which provides a second bias voltage. MOSFET 140 and MOSFET 142 function as a differential comparator circuit for comparing the voltage on node 112 to the bias voltage provided by conductor 146.

The drain of MOSFET 140 is coupled to the source terminal of enhancement mode MOSFET 148 which has its gate and drain terminals coupled to the positive supply voltage VDD such that MOSFET 148 functions as a load impedance. The drain of MOSFET 140 is also coupled to the gate terminal of MOSFET 150. The drain terminal of MOSFET 142 is coupled to the source terminal of enhancement mode MOSFET 152 which has its gate and drain terminals coupled to the positive supply voltage VDD. The drain terminal of MOSFET 142 is also coupled to the gate terminal of MOSFET 154. MOSFET 154 has its drain terminal coupled to the positive supply voltage VDD, and its source terminal is coupled to the gate and drain terminals of MOSFET 156 as well as to the gate terminal of MOSFET 158. The source terminal of MOSFET 156 and the source terminal of MOSFET 158 are coupled to ground potential such that MOSFET 156 and MOSFET 158 form a current mirror arrangement. The drain terminal of MOSFET 158 is coupled to the source of MOSFET 150 and to the input of inverter 160. The drain of MOSFET 150 is coupled to the positive supply voltage VDD. The output of inverter 160 is coupled to the input of inverter 162, and the output of inverter 162 is coupled to conductor 88 for providing the control signal VMODL.

Within block 110 is a bias chain formed by a plurality of series connected MOSFET devices coupled between positive supply terminal $V_{DD}$ and ground. MOSFET 164 has its gate and drain terminals coupled to the positive supply voltage VDD, while the source terminal of MOSFET 164 is coupled to the gate and drain terminals of MOSFET 166. The source of MOSFET 166 is coupled to conductor 80 for providing bias voltage VRBIAS. The source of MOSFET 166 is also coupled to the gate and drain terminals of MOSFET 168, and the source of MOSFET 168 is coupled to conductor 146 for providing a second bias voltage. The source of MOSFET 168 is also coupled to the gate and drain terminals of MOSFET 170 and the source of MOSFET 170 is coupled to ground potential.

The comparator circuit or level detector shown within dashed block 108 functions in the following manner. If the voltage on $\overline{\text{RESET}}$ pin 98 is less than the bias voltage provided by conductor 146, then MOSFET 140 will be non-conductive, while the drain terminal of MOSFET 142 will conduct the current provided by MOSFET 144. The current conducted by MOSFET 142 pulls the source of MOSFET 152 to a low level, thereby cutting off MOSFET 154. The source terminal of MOSFET 148 pulls the gate of MOSFET 150 to a high level, thereby allowing MOSFET 150 to conduct. Since MOSFET 154 is non-conductive, no bias current is provided to MOSFET 156, and MOSFET 158 is non-conductive. Thus, the input to inverter 160 is a high level. However, when the voltage on the $\overline{\text{RESET}}$ input pin 98 rises above the bias voltage on conductor 146, MOSFET 140 is conductive and MOSFET 142 is non-conductive. In this case, the gate terminal of MOSFET 150 is pulled down to a low level, while the gate terminal of MOSFET 154 is pulled up to a high level. MOSFET 156 is made conductive by the current supplied by MOSFET 154, and MOSFET 158 is made conductive by the gate to source voltage developed across MOSFET 156. The input to inverter 160 is now a low level.

In FIG. 3, timing waveforms are shown for the voltage at the $\overline{\text{RESET}}$ input pin as well as voltages for other points in the circuit. Two cases are shown for the $\overline{\text{RESET}}$ input voltage. In the first case, an input pulse with relatively fast rising and falling edges is shown which may correspond to the voltage produced by the output of a TTL (transistor-transistor logic) logic circuit. In the second case, a slowly rising input voltage is shown which may correspond to the voltage produced on the $\overline{\text{RESET}}$ input pin when this input pin is coupled to the positive supply voltage VDD by an appropriate RC network. Such a connection might be desired to automatically reset the data processor whenever the data processor is initially coupled to the power supply voltage.

As the $\overline{\text{RESET}}$ input pin voltage rises, the Schmidt trigger circuit shown within dashed block 106 (FIG. 2) will switch when the input voltage reaches a predetermined voltage. In FIG. 3, this predetermined voltage ($V_{RR}$) is roughly 3.3 volts in the preferred embodiment. The waveform labeled VRESET in FIG. 3 shows the voltage provided by terminal 137 in the Schmidt trigger circuitry of FIG. 2, and it will be noted that this voltage switches to a low level when the $\overline{\text{RESET}}$ input voltage reaches the $V_{RR}$. Prior to the time that the $\overline{\text{RESET}}$ input voltage reaches $V_{RR}$, the input/output circuitry associated with pin 6 (FIG. 1) is forced to be in the input mode. However, once the $\overline{\text{RESET}}$ input voltage surpasses $V_{RR}$, the software instructions executed by the data processor may change the input/output circuitry associated with pin 6 to select the output mode of operation. Thus, it is necessary to latch the logic state on pin 6 into the mode programming latch register before the data processor begins execution of the restart software routine. The level detector circuit within dashed block 108 of FIG. 2 functions to latch the mode programming latch register prior to the time that the data processor reset signal VRESET switches to a low level. The waveform labelled VMODL shows the voltage produced on conductor 88 by the level detector circuitry within dashed block 108 in FIG. 2. This bias voltage provided by conductor 146 is selected such that VMODL switches to a low level when the $\overline{\text{RESET}}$ input voltage reaches voltage $V_{RL}$ which, in the preferred embodiment, is roughly 1 volt. When VMODL switches to a low level, the input to the mode programming latch register is disabled such that the mode of operation is selected before the restart software routine can alter input/output pin 6 to assume the output mode of operation.

As previously mentioned, one method of programming input/output pin 6 to be a low level during mode selection is to connect a diode from pin 6 to the $\overline{\text{RESET}}$ input pin 98. This feature imposes the constraint that the mode programming latch register must latch the low logic level on pin 6 before the $\overline{\text{RESET}}$ input voltage rises sufficiently positive to make the voltage on pin 6 approach a high logic level. The waveform labeled $V_{PGM}$ in FIG. 3 corresponds to the voltage output by inverter 82 in FIG. 1 assuming that a diode has been connected as suggested. In this case, the level shifting circuitry formed by MOSFET 72 and MOSFET 78 in FIG. 1 is selected such that the $V_{PGM}$ voltage does not switch to a high level until the $\overline{\text{RESET}}$ input voltage has reached $V_{RP}$ which, in the preferred embodiment, is roughly 2.8 volts. Since VMODL switches to a low level prior to the time that $V_{PGM}$ switches to a high level, the mode programming latch register properly latches a low logic level.

FIG. 4 is a block diagram illustrating an application of the preferred embodiment of the invention. A plurality of input/output circuit blocks 172, 174, 176, and 178 are coupled to a plurality of input/output terminals 180, 182, 184, and 186 respectively. Input/output blocks 172, 174, 176, and 178 are coupled to conductors 188, 190, 192 and 194, respectively, which form an internal digital bus within the data processor. Three mode programming latches 196, 198, and 200 are coupled to terminals 180, 182, and 184 in order to form a three bit mode programming latch register. The output of the mode programming latch register is coupled to a mode select decode block 202 by conductors 204, 206 and 208. Mode select decode block 202 decodes one of eight possible modes of operation and generates a plurality of control signals for configuring the data processor into the selected mode. The eight possible modes of operation in the preferred embodiment are described in previously mentioned co-pending application Ser. No. 873,045, now abandoned. However, those skilled in the art will realize that mode select decode block 202 may also be used to control various other functions within a data processor such as modifying the instruction set of a data processor by controlling the decoding of instructions in the data processor instruction register. For an example of such an application of the present invention, see U.S. Pat. No. 4,236,204, "Instruction Set Modifier Register" invented by Groves, issued Nov. 25, 1980 and assigned to the assignee of the present invention.

While the invention has been described with reference to a preferred embodiment, the description is for illustrative purposes only and is not to be construed as limiting the scope of the invention. Various modifications and changes may occur to those skilled in the art without departing from the true spirit and scope of the invention as defined in the appended claims.

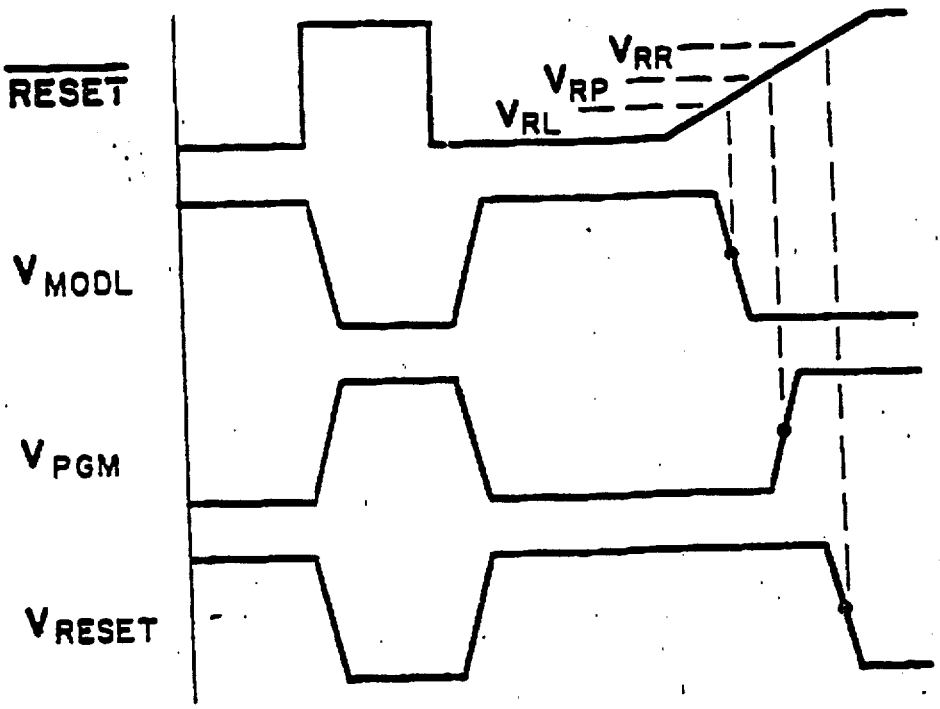
Fig 3
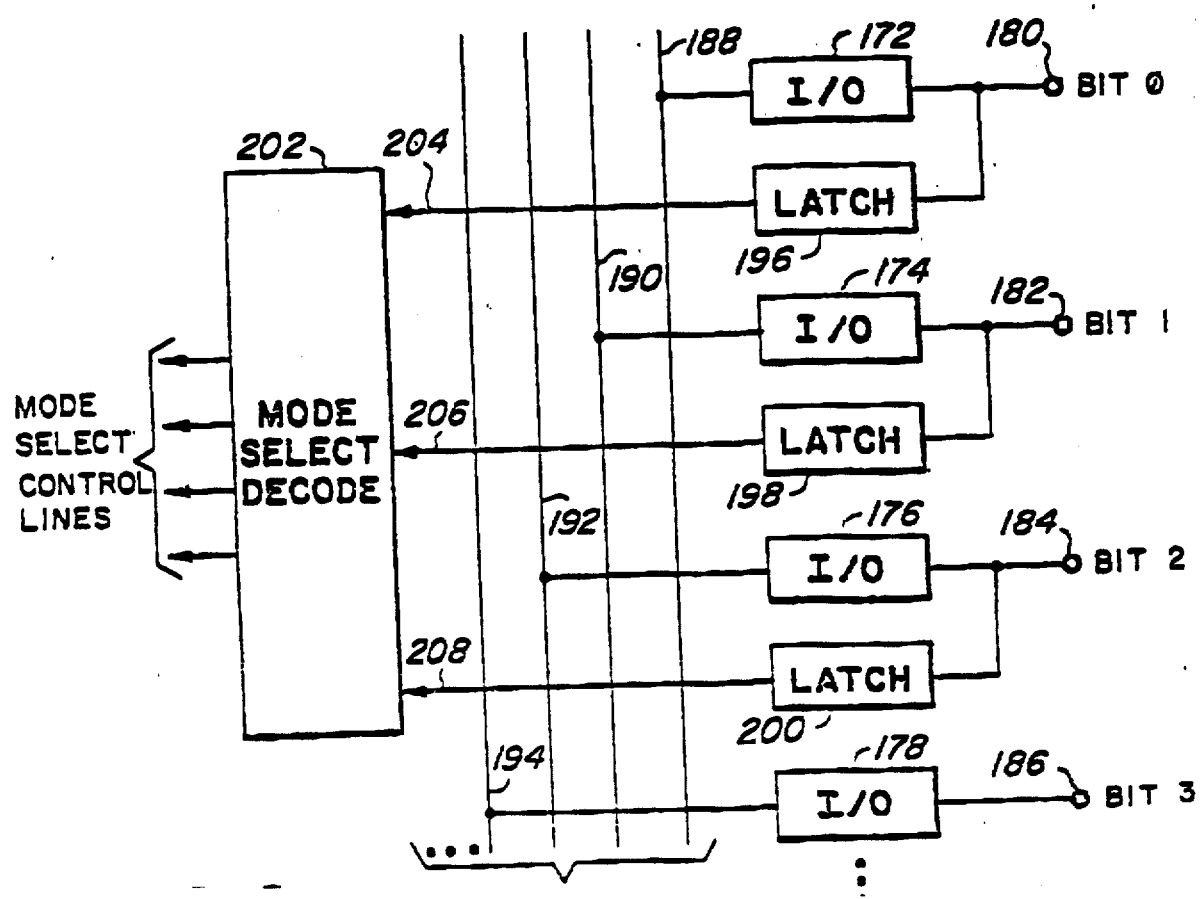

We claim:

1. An integrated circuit microprocessor comprising:
   an input/output terminal,
   a reset terminal,
   an input storage element for storing digital information input to the microprocessor, an output storage element for storing digital information to be output from the microprocessor, reset means for receiving a reset signal coupled to the reset terminal, and for resetting and initializing the microprocessor to perform a predetermined operation, in response to the reset signal changing from a first predetermined voltage level to a second predetermined voltage level, input/output means coupled to the reset means and to the output storage element, for selectively coupling the output storage element to the input/output terminal in response to at least one operation of the microprocessor, but only when the reset signal is at the second voltage level, and voltage level detection means coupled to the reset means and to the input storage element, for selectively coupling the input storage element to the input/output terminal when the reset signal is at the first voltage level, and for uncoupling the input storage element from the input/output terminal when the reset signal thereafter changes to a predetermined voltage level intermediate the first and second voltage levels.

2. The microprocessor as recited in claim 1 wherein the input storage element comprises a latch circuit.

3. The microprocessor as recited in claim 2 wherein the latch circuit is responsive to a digital signal coupled thereto from the input/output terminal by the voltage level detection means only when the reset signal is at the first voltage level.

4. The microprocessor as recited in claim 1 further including mode selection circuitry responsive to the contents of the input storage element for selecting the operating mode of the microprocessor.

5. A circuit for use in an integrated circuit microprocessor for storing a mode selection signal representing a particular one of a plurality of possible operating modes for the microprocessor, the circuit comprising:

a first terminal for receiving a reset signal;

reset means coupled to the first terminal, for resetting and initializing the microprocessor to perform a predetermined operation in response to the reset signal changing from a first predetermined voltage level to a second predetermined voltage level;

a second terminal for receiving the mode selection signal;

a storage circuit for storing the mode selection signal upon the mode selection signal being coupled thereto;

voltage level detection means coupled to the first terminal, for generating a control signal having a first state when the reset signal is at a first predetermined voltage level and having a second state when the reset signal thereafter changes to a third predetermined voltage level intermediate the first and second predetermined voltage levels; and coupling means coupled between the storage circuit and the second terminal and responsive to the control signal, for coupling the second terminal to the storage circuit when the control signal is in the first state, and for uncoupling the second terminal from the storage circuit when the control signal is in the second state, whereby the mode selection signal received by the second terminal when the reset signal is at the first voltage level is selectively coupled to, and stored by, the storage circuit.

6. The circuit as recited in claim 5 wherein the voltage level detection means comprises:

reference voltage means for providing a reference voltage at the predetermined voltage level intermediate the first and second voltages, and a differential amplifier including first and second MOSFET devices having the source terminals thereof coupled together, the gate terminal of the first MOSFET device coupled to the first terminal, and the gate terminal of the second MOSFET device coupled to the reference voltage means.

7. An integrated circuit microprocessor comprising:

a reset terminal;

a first terminal;

reset means coupled to the reset terminal, for resetting and initializing the microprocessor to perform a predetermined operation in response to a reset signal applied to the reset terminal changing from a first predetermined voltage to a second predetermined voltage;

storage means for storing digital data upon the data being coupled thereto;

voltage level detection means coupled to the reset means, for generating a control signal having a first state when the reset signal is at the first predetermined voltage level and having a second state when the reset signal thereafter changes to a third predetermined voltage level intermediate the first and second predetermined voltage levels;

first coupling means coupled between the storage means and the first terminal, for selectively coupling the storage element to the first terminal in response to at least one operation of the microprocessor but only when the reset signal is at the second voltage level; and second coupling means coupled between the storage means and the first terminal and responsive to the control signal, for coupling the first terminal to the storage means when the control signal is in the first state, and for uncoupling the first terminal from the storage means when the control signal is in the second state, whereby digital data received by the first terminal when the reset signal is at the first voltage level is selectively coupled to, and stored by, the storage means.

8. The microprocessor of claim 7 wherein the digital data stored by the storage means represents a particular one of a plurality of possible operating modes of the microprocessor, the microprocessor further including:

mode select means coupled to the storage means, for selecting the particular one of the plurality of possible operating modes of the microprocessor represented by the stored digital data upon the resetting of the microprocessor by the reset means in response to the reset signal.

9. An integrated circuit microprocessor having a plurality of possible operating modes comprising:

a reset terminal;

a data terminal for receiving digital data representing a particular one of said plurality of operating modes;

storage means for storing said digital data upon the data being coupled thereto;

reset means coupled to the reset terminal, for resetting and initializing the microprocessor to perform a predetermined operation in the one of said possible operating modes represented by the data stored in the storage means, in response to a reset signal applied to the reset terminal changing from a first predetermined voltage to a second predetermined voltage;

voltage level detection means coupled to the reset terminal, for generating a control signal having a first state when the reset signal is at the first predetermined voltage level and having a second state when the reset signal thereafter changes to a third predetermined voltage level intermediate the first and second predetermined voltage levels; and coupling means coupled between the storage means and the data terminal and responsive to the control signal, for coupling the data terminal to the storage means when the control signal is in the first state, and for uncoupling the data terminal from the storage means when the control signal is in the second state, whereby digital data received by the data terminal when the reset signal is at the first voltage level is selectively coupled to, and stored by, the storage means.

* * * * *

UNITED STATES PATENT AND TRADEMARK OFFICE
CERTIFICATE OF CORRECTION

PATENT NO. : 4,432,049

DATED : February 14, 1984

INVENTOR(S) : Shaw et al

It is certified that error appears in the above-identified patent and that said Letters Patent is hereby corrected as shown below:

In the drawings, please insert Fig. 3 and Fig. 4 as per attached sheet.

Signed and Sealed this

Ninth Day of March, 1993

*Attest:*

STEPHEN G. KUNIN

*Attesting Officer*     *Acting Commissioner of Patents and Trademarks*